Jan. 3, 1939. C. H. NORTON Re. 20,965

VENETIAN SHADE

Original Filed July 6, 1936 2 Sheets-Sheet 1

Inventor
Chester H. Norton.

By Lacey & Lacey, Attorneys

Jan. 3, 1939.

C. H. NORTON

Re. 20,965

VENETIAN SHADE

Original Filed July 6, 1936

2 Sheets-Sheet 2

Inventor

Chester H. Norton.

By Lacey & Lacey,

Attorneys

Reissued Jan. 3, 1939 Re. 20,965

UNITED STATES PATENT OFFICE 20,965

VENETIAN SHADE

Chester H. Norton, New York, N. Y.

Original No. 2,100,976, dated November 30, 1937, Serial No. 89,177, July 6, 1936. Application for reissue May 21, 1938, Serial No. 209,389

14 Claims. (Cl. 156—16)

This invention relates to window shades and more particularly to that class of shades commonly known as Venetian shades.

The object of the invention is to provide a slatted pull shade, the individual slats or panels of which extend vertically of the window and may be convenienty adjusted at any desired angle with respect to each other so as to control the amount of light entering a room between said slats and also the direction of said light rays, while, at the same time, permitting clear visibility in all directions between the individual slats when the shade is in either lowered or partially lowered position.

A further object of the invention is to provide a slatted shade having vertical slats or panels formed of durable flexible material whereby to permit the shade to be attached to and wound upon a standard curtain roller, the lower ends of the slats being pivotally mounted on a transverse end bar so that by rotating or partially rotating the pivoted ends of the slats, the lower portions of said slats will be twisted to the right or the left and thus present different artistic effects with or without the standard opaque curtain as a background.

A further object is to provide the curtain roller with spacing members for guiding the individual slats or panels on said roller when raising or lowering the shade and also to insure proper and uniform spacing of the several slats.

A further object of the invention is to provide a decorative shade of vertical flexible slats which are constantly held under tension and which may be disposed so as to display opposite surfaces of the slats at the top and bottom of the shade.

A still further object of the invention is generally to improve this class of devices so as to increase their utility, durability and efficiency.

In the accompanying drawings forming a part of this specification and in which similar numerals of reference indicate corresponding parts in all the figures of the drawings, Figure 1 is a front elevation of a slatted shade constructed in accordance with the present invention, the shade being shown in partially elevated position and a portion of the shade broken away to show the opaque pull curtain at the rear thereof.

Figure 1:
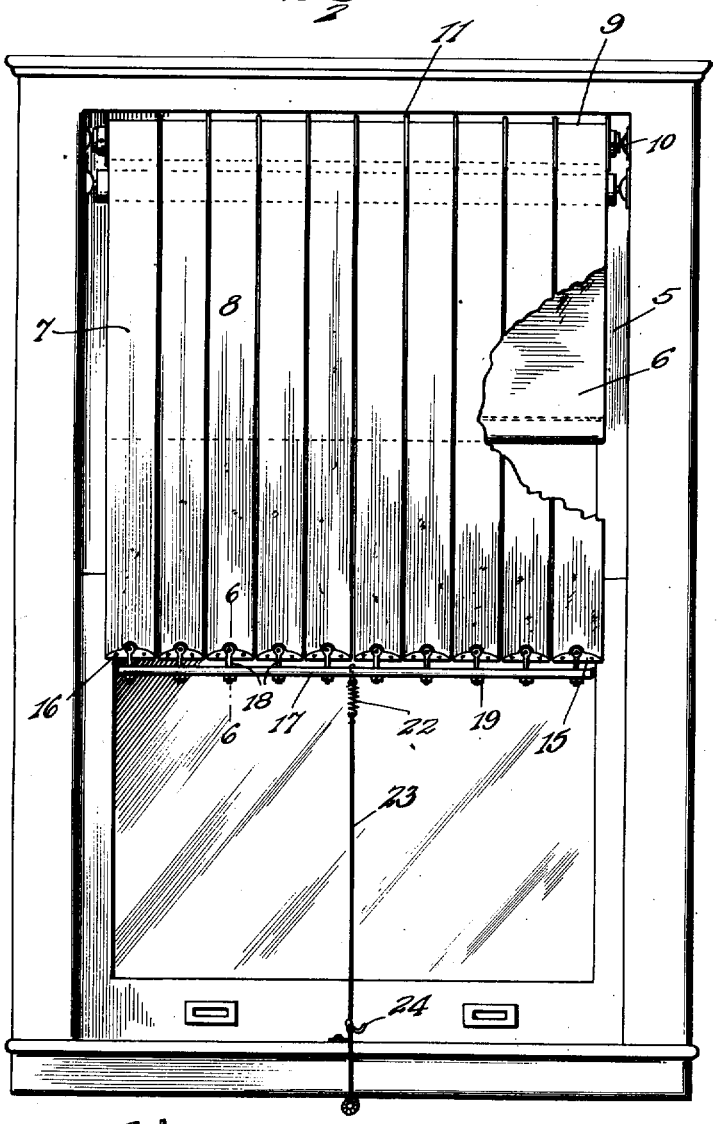
Figure 2:
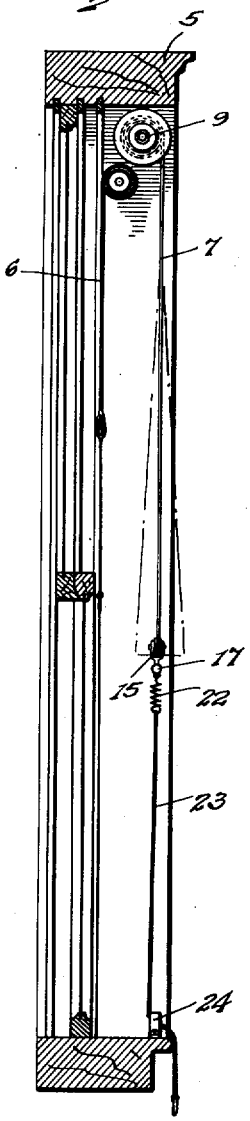
Figure 2 is a side elevation.
Figure 6:
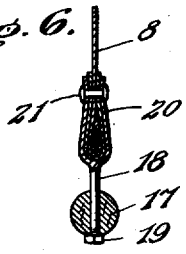
Figure 6 is an enlarged vertical sectional view taken on the line 6—6 of Figure 1.
Figure 7:
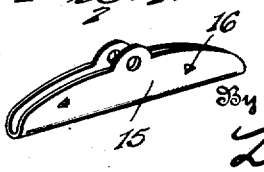
Figure 7 is a perspective view of one of the end clips of the slats detached.

The slatted shade forming the subject-matter of the present invention is adapted to be positioned either inside or outside the window jamb in front of the usual opaque pull curtain, and in Figure 1 of the drawings, the window is indicated at 5, the pull curtain at 6, and the improved slatted shade at 7. The slatted shade may be made of any durable flexible material, but it is preferred to construct the same of regular pull shade cloth, the opposite faces of which are of contrasting colors so as to give the artistic effects hereinafter referred to. The device comprises a plurality of individual vertically disposed slats or panels 8, the upper ends of which are secured in any suitable manner to a spring roller 9 mounted in standard brackets 10 at the upper end of the window frame, as shown. Slidably mounted on the curtain roller 9 are spacing members 11 preferably annular in shape and of sufficient size to form guiding partitions or barriers between the individual slats 8 when the latter are wound upon the curtain roller. The terminal spacing members 12 are preferably provided with lateral flanges 13 which are secured to the curtain roller by tacks or similar fastening devices 14 so as to prevent movement thereof. The spacing members 12 and flanges 13 serve to insure proper and uniform rolling of the slats as they prevent piling up of the slats on each other or overlapping at the sides of the shade when the shade is raised. Secured to the lower end of each slat or panel 8 is a reinforcing clip 15 preferably formed of sheet metal and which serves to reinforce the slats and prevent raveling of the lower ends thereof. The clips 15 are substantially V-shape in cross section so as to embrace opposite sides of the slats and the material constituting the lower ends of the slats is preferably rolled or folded to prevent raveling and secured within the clips by pressing or denting the metal to form spurs 16 which engage the slats, as shown.

Extending transversely of the window immediately below the lower ends of the slats is a bar 17 having spaced bolts 18 extending vertically therethrough with their lower ends threaded for engagement with suitable clamping nuts 19. The upper end of each bolt 18 is bifurcated, at 20, to receive the reinforcing clip on the adjacent slat 8 and to which it is secured by a bolt or rivet 21. The portions of the bolts 18 passing through the bar 17 are devoid of threads so as to permit said bolts to rotate within the bar 17 and thus allow for twisting or angular adjustment of the lower ends of the slats of the shade. The slats 8 are separate and distinct from each other with the space between the slats relatively narrow so that when the shade is pulled down, the slats will form an effective closure for the interior of a room and prevent the entrance of sunlight therein. Inasmuch as the slats 8 are flexible, however, they may be readily separated to permit clear visibility in all directions between the slats, when desired, even though the shade is down.

By having each individual slat pivotally connected with the bar 17, the lower ends of said slats may be twisted at any angle of inclination with respect to each other so as to control the amount of light entering a room between said slats and the direction of said light rays. For illustration, the slats on one side of the medial longitudinal line of the shade may be adjusted so that they incline towards said line and the slats on the other side adjusted at a different angle or all of said slats may be adjusted at the same angle, the arrangement of the parts being such that any desired adjustment may be effected at a moment's notice merely by turning or twisting the lower ends of said slats.

Figure 3:
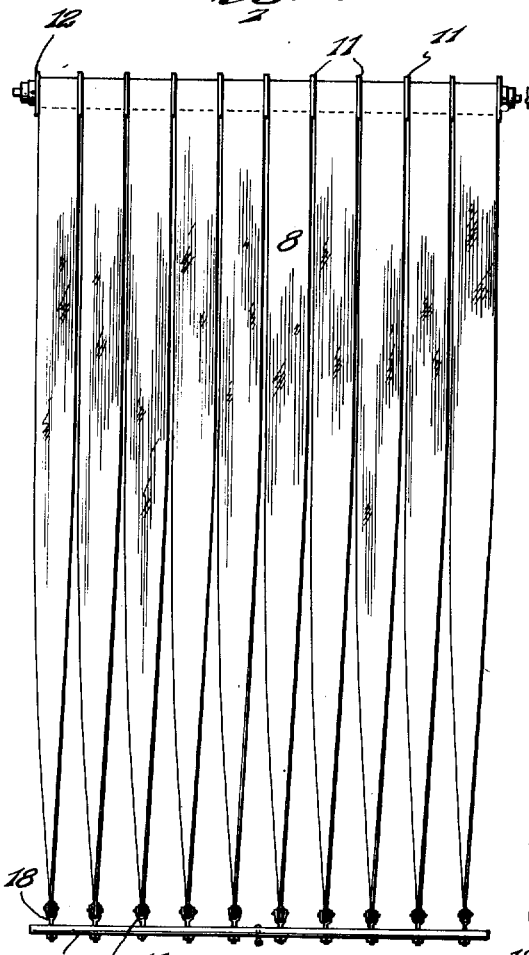
Figure 3 is a front elevation showing the lower or pivoted ends of the individual slats partially rotated to permit the entrance of light rays therebetween.

In Figure 3 of the drawings the lower ends of the slats have been given a half turn so that the space between the lower ends of the slats is relatively wide, while the upper ends of the slats remain substantially in contact with each other, the turning of the slats imparting a twisting movement thereto, as will be readily understood.

Figure 4:
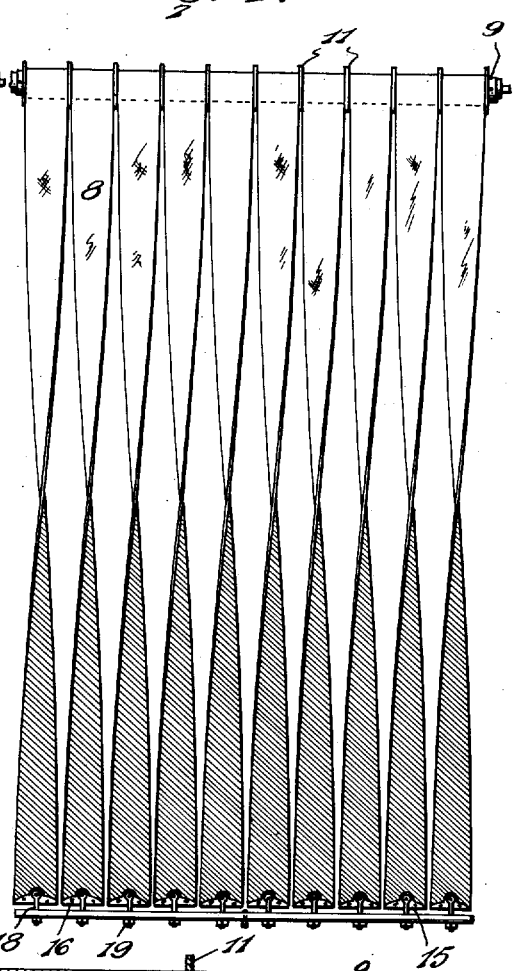
Figure 4 is a similar view showing the lower or pivoted ends of the individual slats or panels completely rotated so as to give a twisting effect to said slats with the upper and lower portions of the slats displaying contrasting colors.
Figure 5:
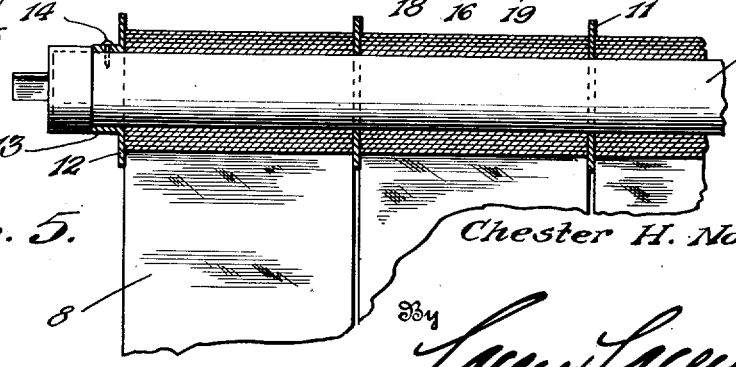
Figure 5 is a vertical sectional view showing the spacing members for the individual slats or panels mounted on a standard spring curtain roller.

When the opposite surfaces of the material of which the shade is formed are of contrasting colors, very pretty and artistic effects may be produced by completely rotating the lower ends of the panels, as shown in Figure 4, and this effect will be materially enhanced when the opaque pull curtain 6 is in lowered position. However, it is not necessary that the pull curtain be in lowered position as very striking lighting effects may be obtained within a room by allowing the light rays to pass between the slats when the latter are adjusted, as illustrated in Figure 4. Many different artistic effects may be obtained by rotating or partially rotating the lower ends of the individual slats and further detail description thereof is deemed unnecessary. Secured to the bar 17 is a coiled spring 22 to which is attached a pull cord 23 to facilitate raising and lowering of the shade. The lower end of the pull cord fastens in a spring clip 24 secured to the window sill so as to hold the slatted shade under tension. It will here be noted that inasmuch as the slats or panels 8 are secured to the spring roller 9, the slatted shade may be raised and lowered in a manner similar to an ordinary pull shade and turning or tangling of the slats is effectually prevented by means of the spacing members 11. It will further be noted that the spring roller acts as a tension device for the upper ends of the slats while the spring 22 exerts a tension on the lower ends of said slats. When it is not desired to use the slatted shade, said shade may be compactly wound upon the roller 9 by releasing the pull cord from the clip 24 and exerting a slight downward pull on said cord. Conversely, the slatted shade may be lowered to any desired position of vertical adjustment with respect to the window by again manipulating the pull cord 23 and after adjustment of the shade has been effected, holding the shade in adjusted position by inserting the pull cord in the spring clip. As the winding of the flexible slats on the spring roller 9 is in a direction opposite to that of the winding of the standard shade or curtain 6, ample space is provided between the parts to permit proper operation of the slatted shade.

It will, of course, be understood that the Venetian shades may be made in different sizes and of any desired material without departing from the spirit of the invention.

Having thus described the invention, what is claimed as new is:

1. A shade comprising a supporting roller, spacing members carried by the roller, vertically disposed flexible slats having their upper ends secured to the roller between the spacing members, a transverse bar extending across the lower ends of the slats, and an independent pivotal connection between each slat and said bar to permit independent angular adjustment of the slats by individually turning the slats from their lower ends.

2. A shade comprising a spring actuated roller, vertically disposed slats having their upper ends secured to the roller and adapted to be wound thereon, a transverse bar at the lower ends of the slats, and pivot bolts extending through the bar and rotatable therein and engaging the lower ends of companion slats whereby to permit independent angular adjustment of the lower ends of the slats without disturbing the upper ends thereof.

3. A shade comprising a supporting roller, vertically disposed flexible slats having their upper ends secured to the roller and adapted to be wound thereon, reinforcing clips secured to the lower ends of the slats, a transverse bar, and vertical bolts rotatably mounted through in the bar and each having a bifurcated upper portion embracing the clip of a companion slat and rigidly secured thereto whereby each strip may be turned about the axis of the companion bolt and twisted intermediate its length to dispose its end portions in adjusted angular relation to each other.

4. A Venetian shade comprising a spring actuated supporting roller, terminal and intermediate spacing members carried by the roller, the terminal spacing members being stationary and the intermediate spacing members movable on the roller, vertically disposed flexible slats secured to the roller between the spacing members, reinforcing clips secured to the lower ends of the slats, a transverse bar, and an individual pivotal connection between the bar and the clip of each slat for permitting independent transverse angular adjustment of the slats with respect to the bar and each other.

5. A Venetian shade comprising a supporting roller, vertically disposed flexible slats having their inner and outer faces of contrasting colors, said slats having their upper ends secured to the roller and adapted to be wound thereon, a transverse bar disposed at the lower ends of the slats, and pivotal connections between the bar and the individual slats whereby the lower ends of the slats may be individually turned transversely of the bar to twist the slats and display contrasting colors at the top and bottom of the shade.

6. A shade comprising a supporting roller, vertically disposed slats of flexible material secured to the supporting roller and adapted to be wound thereon, substantially U-shaped reinforcing clips carried by the lower ends of the slats and provided with inwardly extending spurs engaging said slats, a transverse bar, vertical bolts rotatably mounted in the bar in spaced relation to each other longitudinally thereof and each rotatable independent of the others, said bolts being provided with bifurcated upper portions embracing the clips, fastening devices extending through the bifurcated portions of the bolts and through said clips, and a pull cord secured to said transverse bar and depending from the transverse bar intermediate the length thereof.

7. A shade comprising a supporting roller, vertically disposed flexible slats secured to the roller and adapted to be wound thereon, a transverse bar at the lower ends of the slats, a pivotal connection between each slat and said transverse bar to permit twisting movement of the lower portions of the slats, means carried by the roller for holding the fixed ends of the slats under tension, and a tension device operatively connected with said transverse bar.

8. A device of the type described, comprising in combination a roller, a shade of flexible material secured to said roller and divided into a plurality of vertical slats, a transverse bar, a pivotal connection between the lower end of each slat of said shade and said bar for permitting twisting of each slat about a vertical axis, and spring means for maintaining said slats always under tension.

9. The device according to claim 8 including a plurality of spacing members carried by said roller, and wherein said slats extend the full length of the shade and are secured to said roller intermediate said spacing members, whereby, when the shade is raised to wind the slats upon said roller, said members serve as guiding partitions for the slats.

10. A shade comprising a supporting roller, vertically disposed slats having their upper ends secured to said roller and adapted to be wound thereon, a transverse bar disposed at the lower ends of the slats, and a pivotal connection between the bar and each slat whereby the lower ends of the slats may be twisted to display opposite surfaces of the slats at the top and bottom of the shade.

11. A shade comprising a supporting roller, terminal and intermediate spacing members carried by the roller, the terminal spacing members being stationary and the intermediate spacing members movable on the roller, vertically disposed flexible slats secured to the roller between the spacing members, a transverse bar, and an independent pivotal connection between the lower end of each slat and said bar for permitting twisting of each slat about a vertical axis.

12. A shade comprising a spring-actuated roller, vertically disposed slats secured to the roller, a transverse bar, and means for connecting the lower end of each slat with said bar, said last mentioned means comprising a plurality of elements each rotatable within said bar to permit angular adjustment of the lower ends of the slats without disturbing the upper ends thereof.

13. A shade of flexible material divided into a plurality of slats each twisted about a longitudinal axis to display opposite faces at opposite ends thereof, a supporting member to which one end of each of said slats is secured, a second member to which the other end of each of said slats is connected and spring means for maintaining said slats always under longitudinal tension.

14. A device of the type described comprising in combination a roller, a shade of flexible material secured to said roller and divided into a plurality of vertical slats, a transverse bar, the lower end of each of said slats being so connected to said bar as to display opposite surfaces at the upper and lower ends of the shade, and spring means for maintaining the slats of said shade always under longitudinal tension.

CHESTER H. NORTON.